United States Patent
Cope

(10) Patent No.: US 6,231,061 B1
(45) Date of Patent: May 15, 2001

(54) VEHICLE FRAME ASSEMBLY AND SPLIT-FRAME VEHICLE

(76) Inventor: Calvin Keith Cope, 6579 N. Bogart La., Boise, ID (US) 83703

( * ) Notice: Subject to any disclaimer, the term of this patent is extended or adjusted under 35 U.S.C. 154(b) by 0 days.

(21) Appl. No.: 09/229,853

(22) Filed: Jan. 13, 1999

(51) Int. Cl.$^7$ .................................................. B60G 3/08
(52) U.S. Cl. ............................ 280/124.111; 280/781; 180/379; 180/312
(58) Field of Search ................ 280/124.111, 124.113, 280/781, 785, FOR 131; 180/379, 380, 383, 376, 312

(56) References Cited

U.S. PATENT DOCUMENTS

| | | | |
|---|---|---|---|
| 2,366,166 | * 1/1945 | Willock | 280/400 |
| 2,792,234 | * 5/1957 | Page | 280/400 |
| 3,664,450 | 5/1972 | Udden et al. | 180/65 R |
| 3,937,289 | 2/1976 | Dickinson | 180/9.44 |
| 4,019,598 | 4/1977 | Fresmann et al. | 180/51 |
| 4,072,203 | 2/1978 | Pierson | 180/9.44 |
| 4,076,267 | * 2/1978 | Lipscomb | 280/87.042 |
| 4,079,955 | * 3/1978 | Thorpe et al. | 280/111 |
| 4,325,445 | 4/1982 | Albee | 180/74 |
| 4,462,204 | 7/1984 | Hull | 60/39.07 |
| 4,466,633 | * 8/1984 | Henley | 280/492 |
| 4,534,577 | 8/1985 | Howard | 280/90 |
| 4,834,406 | 5/1989 | Mukai et al. | 280/91 |
| 4,943,074 | 7/1990 | Kido | 280/91 |
| 4,966,242 | 10/1990 | Baillargeon | 180/9.44 |
| 4,972,915 | 11/1990 | Suketomo et al. | 180/132 |
| 5,180,028 | 1/1993 | Perrenoud, Jr. | 180/235 |
| 5,531,466 | 7/1996 | Hayashi | 280/91.1 |
| 5,549,173 | 8/1996 | Tomita | 180/417 |
| 5,632,350 | 5/1997 | Gauvin | 180/9.44 |
| 5,725,063 | 3/1998 | Ceragioli et al. | 180/14.4 |
| 5,806,870 | * 9/1998 | Hull et al. | 280/400 |

* cited by examiner

Primary Examiner—Lanna Mai
Assistant Examiner—Andrew J. Fischer
(74) Attorney, Agent, or Firm—Ormiston & McKinney, PLLC

(57) ABSTRACT

A split-frame vehicle in which the front and rear sub-frames may rotate relative to one another along a longitudinal axis that runs generally parallel to the ground. In one embodiment, the vehicle includes a locking mechanism operatively coupled between the front and rear sub-frames. The locking mechanism is operative between a locked position in which the sub-frames are rigidly coupled and an unlocked position in which the sub-frames are free to rotate relative to one another. In a second embodiment, the vehicle includes an axial rotator joint connected between the sub-frames. The joint includes a first bearing plate connected to the front sub-frame and a second bearing plate connected to the second sub-frame. The faces of each bearing plate bear on one another and define the rotational interface between the sub-frames. A drive shaft extends through an opening in the center of each bearing plate. The bearing plates are oriented so that the face of each plate is perpendicular to the longitudinal axis that runs generally parallel to the ground and the drive shaft extends along this longitudinal axis. In a third embodiment, rear steering is incorporated into a split-frame four-wheel drive vehicle.

7 Claims, 6 Drawing Sheets

VEHICLE FRAME ASSEMBLY AND SPLIT-FRAME VEHICLE

FIELD OF THE INVENTION

The present invention relates generally to articulated vehicles, and more particularly to a split-frame vehicle which articulates by rotation about an axial rotator joint located between a front sub-frame and a rear sub-frame.

BACKGROUND

Articulated vehicles typically include an articulating joint located inboard to the vehicle providing flexibility about at least one axis. An articulating joint may permit rotation of a first frame member relative to a second frame member about an axis which is substantially parallel to the surface upon which the vehicle is being operated (Rotation). The articulating joint may also permit a pivoting motion of a first frame member relative to a second frame member about a second axis which is substantially perpendicular to the surface upon which the vehicle is being operated (Pivot). In many articulating vehicles, these two capabilities taken in combination permit articulated vehicles to travel in a manner which permits the respective frame members to roll and yaw relative to one another and the surface upon which the vehicle is being operated. In many instances the articulating vehicle's capability to pivot a first frame member relative to a second frame member is the very feature which allows the vehicle to change direction during operation.

Conventional split-frame articulating vehicles are designed for off-road use. It would be advantageous if a split-frame vehicle were capable of operating in the articulating mode for off-road use and in a rigid/non-articulating mode like a conventional on-road vehicle for highway travel. It would also be advantageous to provide such a vehicle with rear steering that is not tied to the vehicles ability to pivot the frame members.

SUMMARY OF THE INVENTION

Accordingly, the invention is directed to a split-frame vehicle in which the front and rear sub-frames may rotate relative to one another along a longitudinal axis that runs generally parallel to the ground. The relative rotation of the sub-frames allows the front and rear axles to lie in different planes to help keep all four wheels on the ground in uneven terrain. The invention includes three basic novel features that may be incorporated alone or in combination into a vehicle frame assembly and a splitframe vehicle. The first feature is a locking mechanism operatively coupled between the front and rear sub-frames. The locking mechanism is operative between a locked position in which the sub-frames are rigidly coupled and an unlocked position in which the sub-frames are free to rotate relative to one another. This first feature makes it practical to use the vehicle both off-road in the unlocked "articulating" mode and in the locked mode like a conventional on-road vehicle.

The second basic feature of the invention is an axial rotator joint connected between the sub-frames. The joint allows the sub-frames to rotate relative to one another along the longitudinal axis that runs generally parallel to the ground while, at the same time, providing a path for transferring driving power through the joint. The joint includes a first bearing plate connected to the front sub-frame and a second bearing plate connected to the second sub-frame. The faces of each bearing plate bear on one another and define the rotational interface between the sub-frames. A drive shaft extends through an opening in the center of each bearing plate. The bearing plates are oriented so that the face of each plate is perpendicular to the longitudinal axis that runs generally parallel to the ground and the drive shaft extends along this longitudinal axis. It is expected that, in most situations, the axial rotator joint will be located along the mid-line of the sub-frames and a suitable yoke will be attached to each end of the drive shaft for connection to the vehicle's front and rear drive lines.

Rear steering is incorporated into a split-frame four-wheel drive vehicle as the third basic feature of the invention. This split-frame vehicle includes a front set of steerable wheels drivingly coupled to the transmission through a first drive train and a rear set of steerable wheels drivingly coupled to the transmission through a second drive train. The second drive train includes a front drive line and a rear drive line. An axial rotator joint, such as the one described above, couples the front sub-frame to the rear sub-frame and the drive shaft in the joint connects the front and rear drive lines so that power may be transmitted through the rotator joint from the engine to the rear wheels. The vehicle also includes a rear steering linkage connected to the rear wheels. In one preferred version of this vehicle, steering force is delivered to the rear wheels by a hydraulic cylinder connected to the rear steering linkage. A hydraulic pump powers the cylinder and a controller located in the cab of the vehicle controls the pump and, therefore, the direction movement of the rear wheels.

These and other novel features of the invention as summarized above and defined in the claims at the end of this Specification may be better understood with reference to the drawings and the following detailed description of the preferred embodiments of the invention.

DETAILED DESCRIPTION

Figure 1:
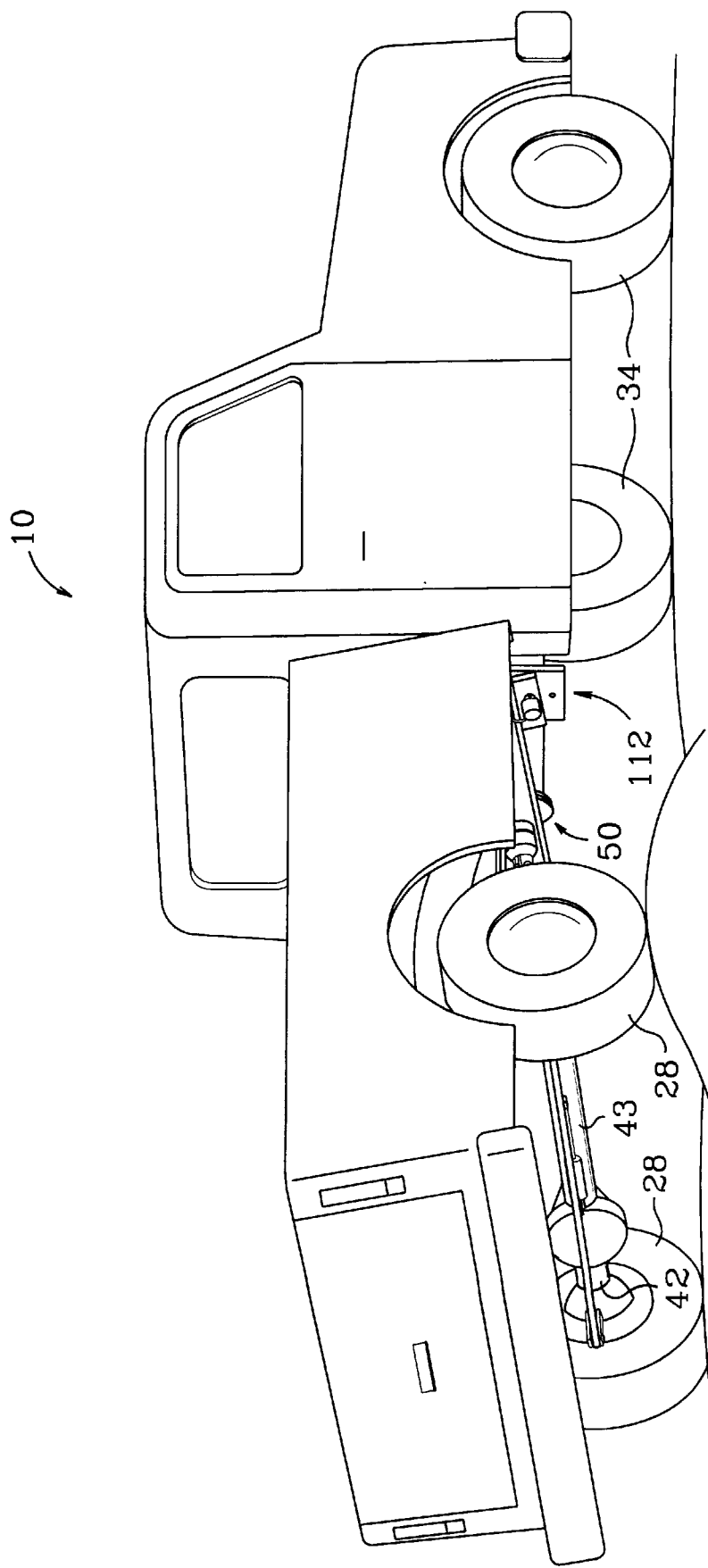
FIG. 1 is a perspective representational drawing of a split-frame utility vehicle including an axial rotator joint according to one embodiment of the present invention.
Figure 2:
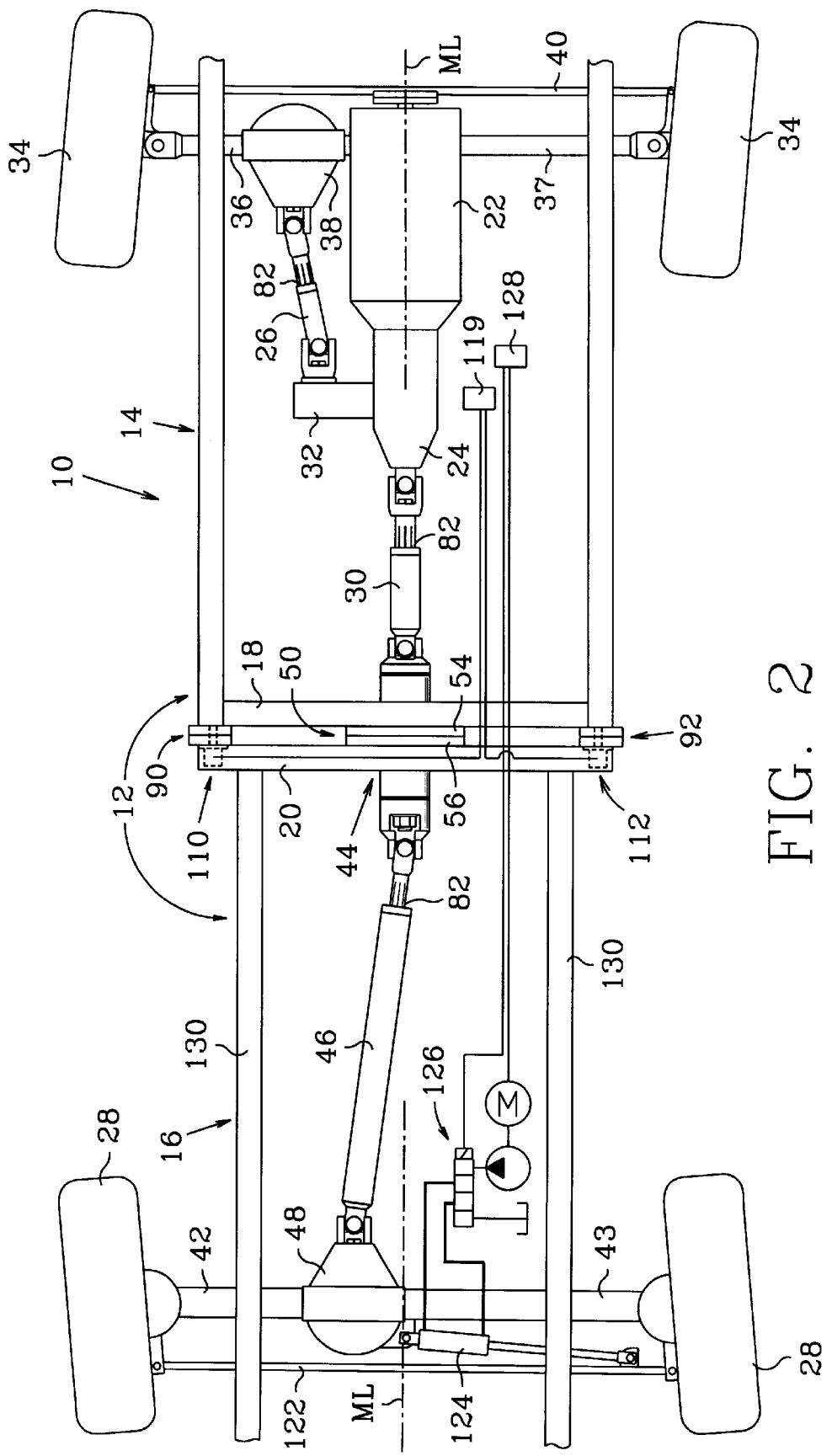
FIG. 2 is a top down plan view schematic representation of a split-frame utility vehicle including an axial rotator and rear wheel steering according to one embodiment of the present invention.

FIG. 1 is a perspective view of a split-frame vehicle 10, in this case a pick-up truck, constructed according to one embodiment of the present invention. FIG. 2 shows the frame, steering and drive train components of vehicle 10. Referring to FIG. 2, vehicle frame 12 includes a front sub-frame 14 and a rear sub-frame 16. A cross member 18 extends across the rear of front sub-frame 14. Another cross member 20 extends across the front of rear sub-frame 16. Front sub-frame cross member 18 and rear sub-frame cross member 20 are positioned parallel and adjacent to one another along the "split" in vehicle frame 12. While it is expected that the position of the split in frame 12 will usually be close to the transverse mid-line of vehicle 10, the position of the split may be varied as necessary to achieve desired performance characteristics of the vehicle.

Vehicle 10 includes an engine 22 and a transmission 24 connected to the output of engine 22. Engine 22 and transmission 24 are supported in front sub-frame 14. The output of transmission 24 is connected to a first front drive line 26 to deliver power to the rear wheels 28. In this embodiment, the output of transmission is also connected to a second front drive line 30 through transfer case 32 to deliver power to steerable and driven front wheels 34. Second front drive line 30 is connected to front axles 36 and 37 through a front axle differential 38. A front steering linkage 40 attached to a steering control mechanism (not shown provides directional control of front wheels 34. First front drive line 26 is connected to rear axles 42 and 43 through an axial rotator joint 44, a rear drive line 46 and rear axle differential 48. Engine 22, transmission 24, drive lines 26 and 46, wheels 28 and 34, axles 36, 37 and 42, 43, differentials 38 and 48 and front steering linkage 40 all represent conventional components found on modern two and four wheel drive vehicles.

Figure 3:
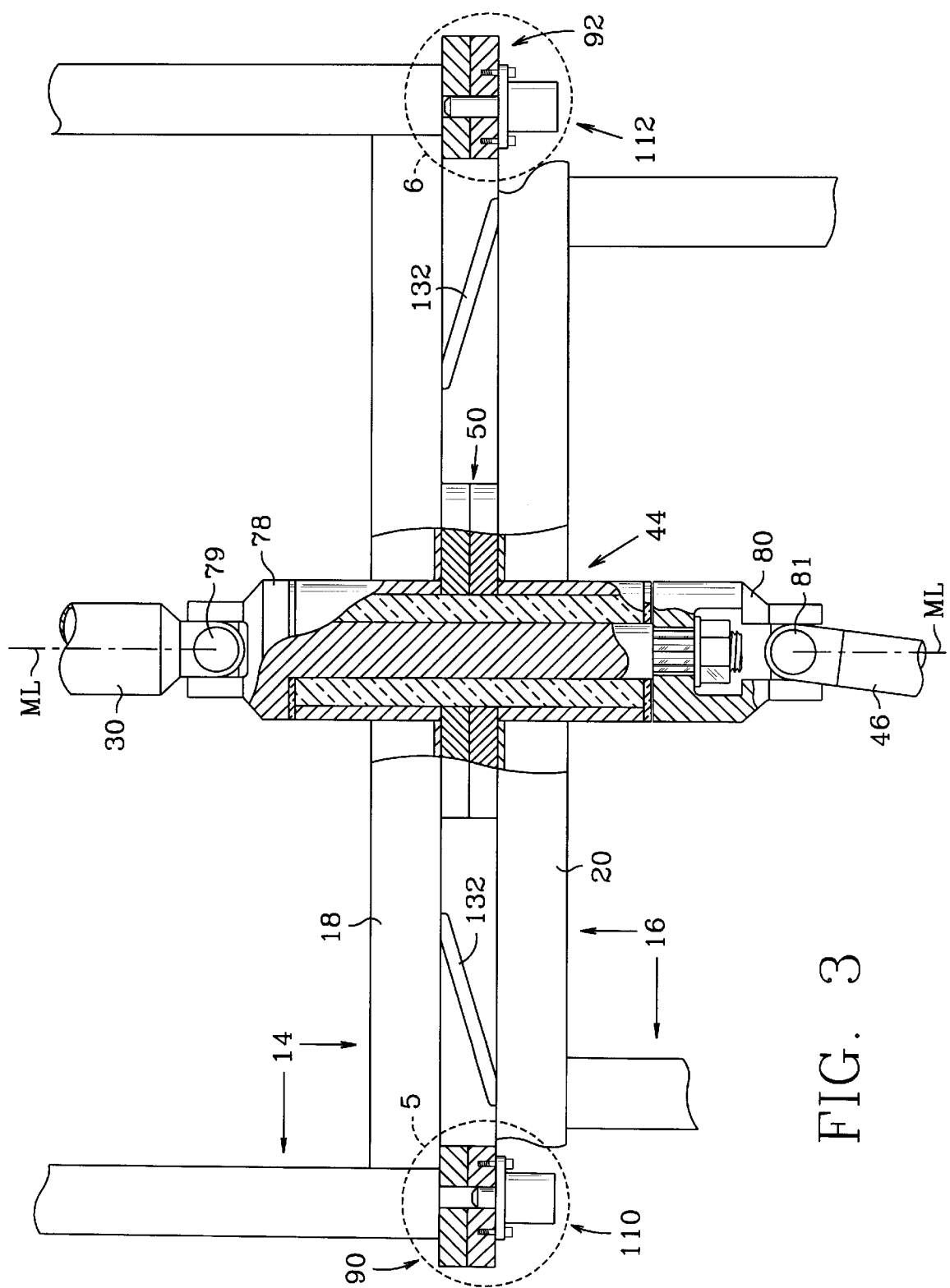
FIG. 3 is a top down plan view detail partial cutaway representation of a splitframe utility vehicle axial rotator joint according to one embodiment of the present invention.
Figure 4:
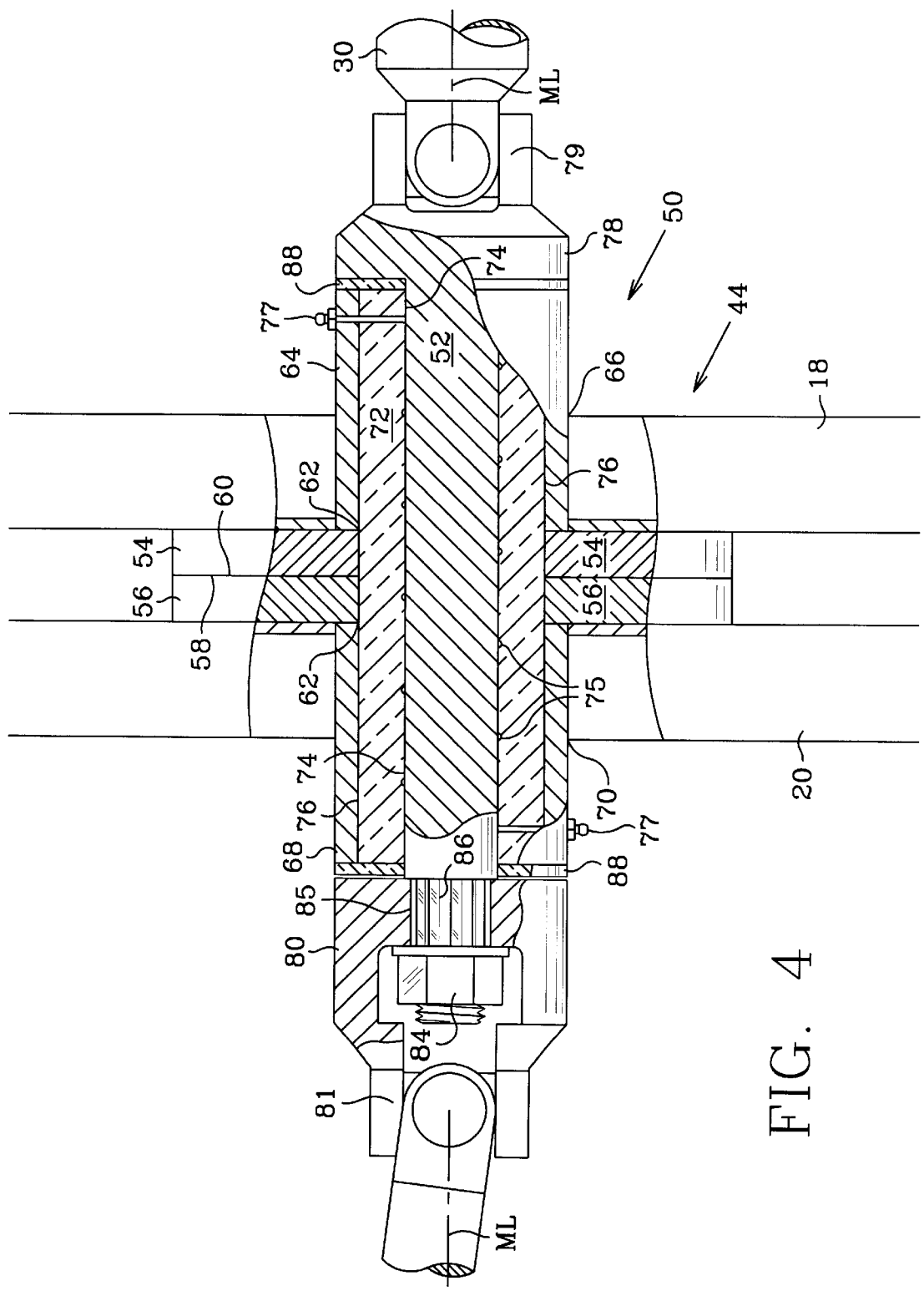
FIG. 4 is a detail view of the axial rotator joint shown in FIG. 3.

Axial rotator joint 44 provides the coupling between front sub-frame 14 and rear sub-frame 16 as well as the drive train linkage between front and rear drive lines 26 and 46. Axial rotator joint 44 is detailed in FIGS. 3 and 4. Referring to FIGS. 3 and 4, axial rotator joint 44 includes a center bearing 50 and a drive shaft 52 that extends through center bearing 50. Bearing 50 is located along a mid-line ML between front sub-frame cross member 18 and rear sub-frame cross member 20. Center bearing 50 includes a front bearing plate 54 welded, bolted or otherwise attached to front sub-frame cross member 18 and a rear bearing plate 56 welded, bolted or otherwise attached to rear sub-frame cross member 20. A rear facing bearing surface 58 of front bearing plate 54 and a front facing bearing surface 60 on rear bearing plate 56 bear against one another as the central and principal contact interface between front and rear sub-frames 14 and 16.

An opening 62 is formed through the center of each bearing plate 54 and 56. A front sleeve 64 extends forward from front bearing plate 54 through an opening 66 in front sub-frame cross member 18. A rear sleeve 68 extends rearward from rear bearing plate 56 through an opening 70 in rear sub-frame cross member 20. Sleeves 64 and 68 extend away from bearing plates 54 and 56 along an axis perpendicular to bearing surfaces 58 and 60. A bushing 72 extends through sleeves 64, 68 and openings 62. The inside surface 74 of bushing 72 is round to provide a suitable bearing surface for drive shaft 52. As shown in FIG. 4, spiral grooves 75 may be formed as necessary or desirable along inside surface 74 to help carry lubricants to the internal bearing surfaces. Grooves 75 are accessed through grease fittings 77. The outside surface 76 of bushing 72 should be the same size and shape as openings 62 and sleeves 64 and 68. Drive shaft 52 is inserted through bushing 39 and inserted through the opening of first bearing sleeve 36 and second bearing sleeve 38. The diameter or other inside dimension of sleeves 64 and 68 should be the same as and aligned with the diameter or other inside dimension of bearing plate openings 62 to continuously support the full length of bushing 72.

Drive shaft 52 extends through bushing 72. A first yoke 78 is coupled to or formed integral with the forward end of drive shaft 52. In the embodiment shown in FIG. 3, first yoke 78 is an integral part of drive shaft 52. First yoke 78 is coupled to front drive line 26 through U-joint 79. A second yoke 80 is coupled to or formed integral with the rearward end of drive shaft 52. Second yoke 80 is coupled to rear drive line 46 through U-joint 81. In the embodiment shown in FIG. 3, second yoke 80 is coupled to drive shaft 52 through a joint 82 locking nut 84 on drive shaft 52. Joint 82 consists of external splines 83 on drive shaft 52 and mating internal splines 86 on second yoke 80. The splines cause drive shaft 52 and yoke 80 to rotate together but permit the two to move endwise. First and second yokes 78 and 80 include shoulders 78a and 80a which abut the ends of sleeves 64, 68 and bushing 72. Shoulder 78a and 80a in conjunction with locking nut 84 retain drive shaft 52 and bushing 72 in sleeves 64 and 68. Wear washers 88 sandwiched between shoulders 78a, 80a and the ends of sleeves 64, 68 and bushing 72 seal the joint and provide bearing surfaces to facilitate the relative motion between yokes 78, 80 and the ends of sleeves 64, 68 and bushing 72. Nut 84 is torqued down as necessary to provide a moderate degree of compression across joint 44. If nut 84 is torqued down too much, the joint may be tight or even bind. If nut 84 is not torqued down enough, the joint may be loose and cause excessive wear.

Figure 5:
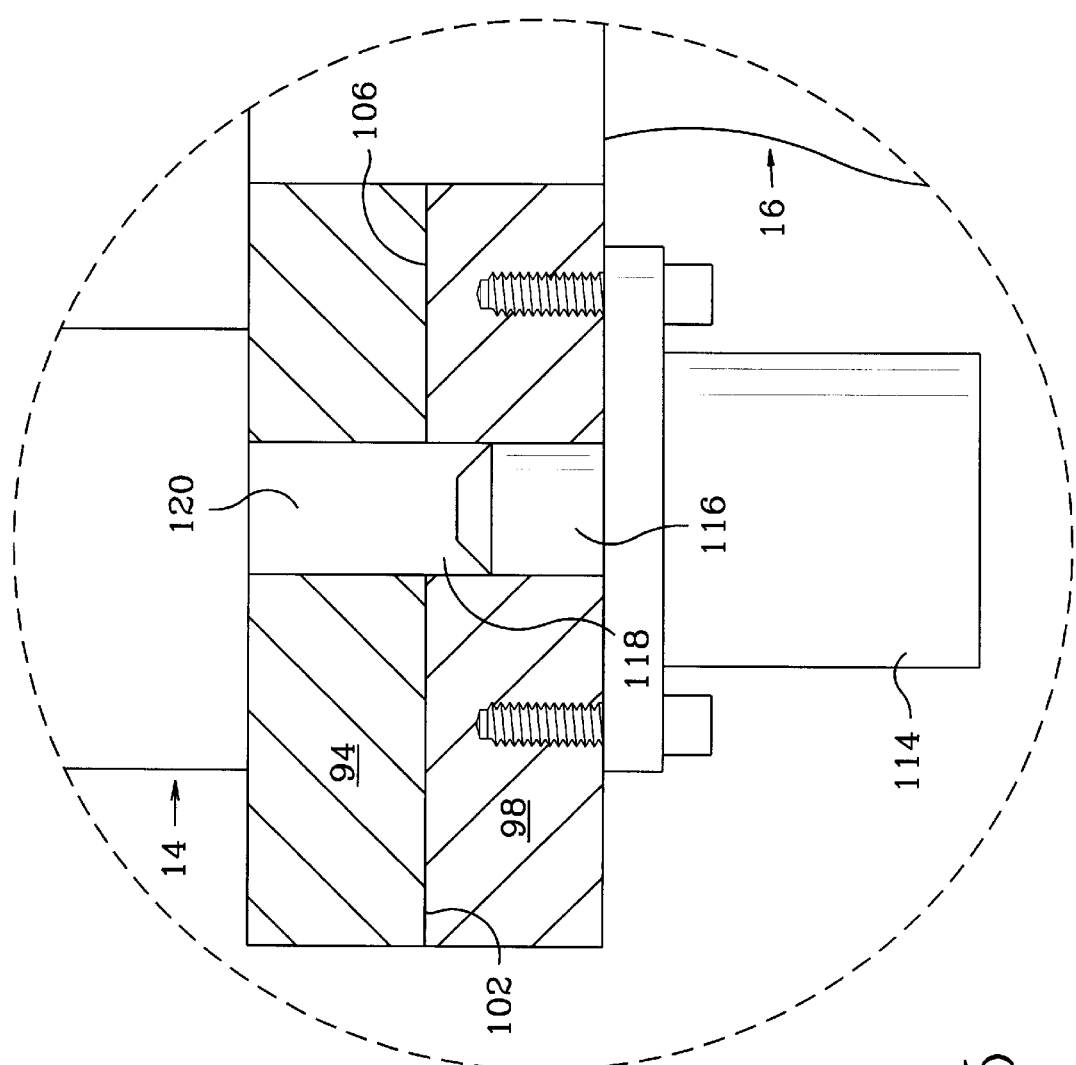
FIGS. 5 and 6 are detail views of the left and right locking mechanisms, respectively, shown in FIG. 3.
Figure 6:
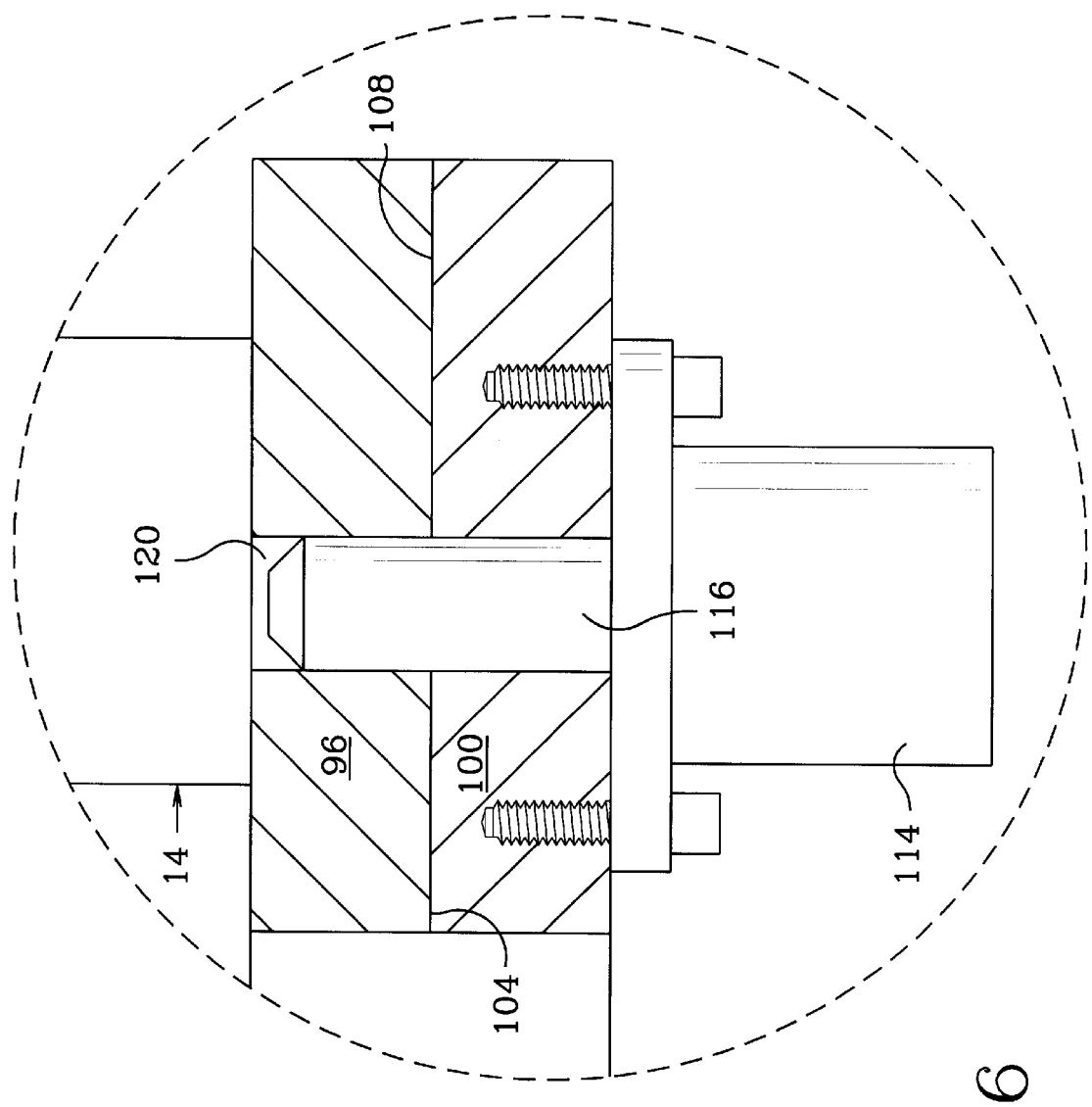

Referring to FIGS. 1–3, a pair of optional outboard bearings 90 and 92 are located outboard from center bearing 50 between front sub-frame 14 and rear sub-frame 16. Referring to the detailed views of FIGS. 3 and 5–6, outboard bearings 90, 92 include front bearing plates 94, 96 welded, bolted or otherwise attached to front sub-frame cross member 18 and rear bearing plates 98, 100 welded, bolted or otherwise attached to rear sub-frame cross member 20. Rear facing bearing surfaces 102, 104 of front bearing plates 94, 96 and a front facing bearing surfaces 106, 108 on rear bearing plates 98, 100 bear against one another as the outboard and secondary contact interface between front and rear sub-frames 14 and 16.

A pair of frame locking mechanisms 110 and 112 are located outboard from center bearing 50. Locking mechanisms 110 and 112 are operative between a first position (locking mechanism 112 in FIG. 3) in which front and rear sub-frames 14, 16 are rigidly coupled and a second position (locking mechanism 110 in FIG. 3) in which the front and rear sub-frames 14, 16 are free to rotate relative to one another. Locking mechanism 112 is shown in the first/locked position and locking mechanism 110 is shown in the second/unlocked position for illustrative purposes only. In actual operation of vehicle 10, both locking mechanisms would be in the same position—either both locked or both unlocked. In this embodiment, each locking mechanism consists of a solenoid 114 and an extendible/retractable pin 116 coupled to solenoid 114. Solenoids 114 are mounted to rear bearing plates 98, 100. Pins 116 extend through holes 118 in rear bearing plates 98, 100 and, when extended, through holes 120 in front bearing plates 94, 96. The position of pin 116 is determined by the energization state of solenoid 114. The energization state of both solenoids 114 is controlled by an electrical switch 119 located within reach of the driver, as shown in FIG. 2. Hence, the driver can easily unlock or lock the sub-frames as may be necessary or desired for off-road travel (unlocked/split frame) or on-road travel (locked/rigid frame). Although two locking mechanisms are preferred for maximum locking force, it may be possible to effectively lock the sub-frames together with only one locking mechanism. It is expected that locking mechanisms 110, 112 will be positioned as far outboard as practicable to develop the maximum moment to resist rotation. Locking mechanisms 110, 112 may be mounted to the rear bearing plates 98, 100 as shown in the Figures, or they may be mounted the front bearing plates 94, 96, on the sub-frame cross members 18, 20 or on any other structurally stable component that allows for selectively locking and unlocking the front and rear sub-frames. Locking mechanisms 108, 112 may be activated manually, using a solenoid as shown in the Figures, hydraulically or through any other suitable activation mechanism or system.

Preferably, rear wheels 28 are steerable. Therefore, and referring again to FIG. 2, vehicle 10 also includes a rear axle steering linkage 122 that extends between rear wheels 28. Rear wheels 28 rotate for steering on half ball joints for what is commonly referred to as "knuckle steering." Steering force is delivered to linkage 122 by a hydraulic cylinder 124 that is mounted between rear axle 43 and linkage 122. Hydraulic cylinder 124 is powered by a hydraulic pump unit 126 which is controlled by a control lever or switch 128. By controlling the degree of extension of hydraulic cylinder 124, controller 128 also specifies the directional movement of the rear wheels. Rear steering hydraulic cylinder controller 128 is located within reach of the driver, preferably near the locking mechanism control switch 119. Hydraulic cylinder 124, pump unit 126 and 128 represent generally any conventional hydraulic system having sufficient capacity to deliver adequate steering force to linkage 122 and rear wheels 28. In some vehicles that are retro-fitted to embody the present invention, it may be necessary to move rear sub-frame rails 130 inboard to accommodate rear wheel steering movement.

Optional return springs 132 are connected between front and rear cross members 18 and 20. Springs 132 are compressed or stretched when cross members 18 and 20 move out of alignment as sub-frames 14 and 16 pivot relative to one another. Springs 132 thus act as a biasing mechanism to urge the cross members toward the aligned position. Other biasing mechanisms could be used in lieu of springs 132. For example, a torsional spring or compression pad could be used at or near center bearing 50 to provide the desired bias towards the aligned position.

"Bearing", as that term is used to describe center and outboard bearings 50 and 90, 92, represents generally any suitable structure or mechanism that allows or facilitates relative axial motion between front sub-frame 14 and rear sub-frame 16. Although facing plates are used in the preferred embodiment shown in the drawings and described above, any bearing that allows relative axial motion between front sub-frame 14 and rear sub-frame 16 may be used. All bearing surfaces may be lubricated as necessary or desired to reduce friction and facilitate the relative motion of the various parts. The bearing plates may be fabricated of metal, preferably having a relatively high hardness value to limit galling of the bearing surfaces, or any other suitable material. A high density plastic, for example, could be used to face or replace the bearing surfaces on the bearing plates.

Although the invention has been shown and described with reference to the foregoing preferred embodiment, various other embodiments of the invention are possible. It is to be understood, therefore, that this and other embodiments may be made without departing from the spirit and scope of the invention which is defined in the following claims.

What is claimed is:

1. A vehicle frame assembly, comprising:
   a first sub-frame having a first cross member;
   a second sub-frame having a second cross member positioned parallel and adjacent to the first cross member, the second cross member rotatably coupled to the first cross member at a center portion of the cross members; and
   a locking mechanism operatively coupled between the first and second cross members at a location away from the center portion of the cross members, the locking mechanism including a pin that moves between a first position in which the cross members are rigidly coupled and a second position in which the cross members are free to rotate relative to one another.

2. A vehicle frame assembly, comprising:
   a first sub-frame;
   a second sub-frame;
   a center bearing rotatably coupling the second sub-frame to the first sub-frame at a center portion of the sub-frames; and
   a locking mechanism operatively coupled between the first and second sub-frames, the locking mechanism including a pin that moves between a first position in which the sub-frames are rigidly coupled and a second position in which the sub-frames are free to rotate relative to one another.

3. A frame assembly according to claim 2, further comprising an outboard bearing slidably interposed between the first sub-frame and a second sub-frame at a location away from the center portion of the sub-frames.

4. The frame assembly according to claim 2, wherein each of the center and outboard bearings comprise:
   a first bearing plate connected to the first sub-frame, the first bearing plate having a face; and
   a second bearing plate connected to the second sub-frame, the second bearing plate having a face and the second bearing plate face bearing on the first bearing plate face.

5. A split-frame vehicle, comprising:
   a frame including a first sub-frame rotatably coupled to a second sub-frame;
   an engine supported by the frame;
   a transmission operatively coupled to the engine;
   a first set of wheels connected to one of the sub-frames;
   a second set of wheels connected to the other of the sub-frames;
   a drive line operatively coupled between the transmission and at least one of the sets of wheels; and
   a locking mechanism operatively coupled between the first and second sub-frames, the locking mechanism including a pin that moves between a first position in which the sub-frames are rigidly coupled and a second position in which the sub-frames are free to rotate relative to one another.

6. A more than two wheel drive split-frame vehicle, comprising:
   a frame including a front sub-frame and a rear sub-frame;
   an engine supported by the front sub-frame;
   a transmission operatively coupled to the engine;
   a front set of steerable wheels drivingly coupled to the transmission through a front drive train;
   a front steering linkage connected to the front wheels
   a rear set of steerable wheels drivingly coupled to the transmission through a second drive train, the second drive train having a first drive line connected to the transmission and a second drive line connected to the rear set of wheels;
   a rear steering linkage connected to the rear wheels;
   an axial rotator joint rotatably coupling the front sub-frame to the rear sub-frame, the axial rotator joint including a rotatable drive shaft connected between the first and second drive lines; and
   a locking mechanism operatively coupled between the front and rear sub-frames, the locking mechanism operative between a first position in which the sub-frames are rigidly coupled and a second position in which the sub-frames are free to rotate relative to one another.

7. The vehicle according to claim 5, wherein steering force is delivered to the rear wheels by a hydraulic system comprising:

a hydraulic cylinder connected to the rear steering linkage;

a hydraulic pump connected to the hydraulic cylinder; and a controller connected to the hydraulic pump.

* * * * *

UNITED STATES PATENT AND TRADEMARK OFFICE
CERTIFICATE OF CORRECTION

PATENT NO. : 6,231,061 B1
DATED : May 15, 2001
INVENTOR(S) : Calvin Keith Cope

It is certified that error appears in the above-identified patent and that said Letters Patent is hereby corrected as shown below:

<u>Column 3,</u>
Line 6, after "transmission" insert -- 24 --

<u>Column 4,</u>
Line 28, delete "a"
Line 63, after "mounted" insert -- on --
Line 67, change "108" to -- 110 --

Signed and Sealed this

Eighth Day of January, 2002

*Attest:*

*Attesting Officer*

JAMES E. ROGAN
*Director of the United States Patent and Trademark Office*